United States Patent Office 3,024,233
Patented Mar. 6, 1962

3,024,233
ANTIBACTERIAL AGENTS
William R. Sherman, Lake Forest, Ill., assignor to Abbott Laboratories, North Chicago, Ill., a corporation of Illinois
No Drawing. Filed Dec. 17, 1959, Ser. No. 860,103
10 Claims. (Cl. 260—247.2)

The present invention is concerned with 1,4-bis-[5-(5-nitro-2-furyl)-2-keto-1,3,4-oxadiazolyl-3-methyl]-piperazine and other substituted derivatives of 5-(5-nitro-2-furyl)-1,3,4-oxadiazol-2-one corresponding to the formula

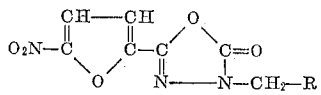

wherein R represents hydroxyl, diloweralkylamino containing from 2 to 8 carbon atoms inclusive, piperidino, pyrrolidino, morpholino and hexamethyleneimino.

These new compounds are crystalline solids and are especially useful as antibacterial agents. For such use, the compounds may be dispersed on an inert, finely divided solid and employed as a dust or they can be dispersed in water and employed as a spray. In representative operations, 5-(5-nitro-2-furyl)-3-pyrrolidinomethyl-1,3,4-oxadiazol-2-one gave complete inhibition of the growth of *Micrococcus pyogenes* var. *aureus*, *Salmonella typhimurium* and *Escherichia coli* when employed as an aqueous composition containing 25 parts by weight of said compound per million parts by weight of ultimate mixture.

The compound wherein R represents hydroxyl can be readily prepared by heating at a temperature of from 30° C. to 100° C. equimolecular proportions of formalin and 5-(5-nitro-2-furyl)-1,3,4-oxadiazol-2-one in an aqueous medium. Upon cooling the reaction mixture, the desired product separates as an oil and is crystallized from a suitable solvent such as ethanol.

The compounds wherein R is diloweralkylamino, piperidino, pyrrolidino, morpholino or hexamethyleneimino can be conveniently prepared by dissolving one molecular proportion of 5-(5-nitro-2-furyl)-1,3,4-oxadiazol-2-one in boiling absolute alcohol or other suitable solvent and adding thereto an equimolecular amount of formalin and amine. Upon cooling the reaction mixture, the desired product precipitates and is further purified by crystallization from a suitable solvent such as ethanol, dimethylformamide or a mixture thereof.

If a piperazine derivative is desired, the reaction is carried out in the same manner as that described in the preceding paragraph except that one molecular proportion of piperazine is reacted with two molecular proportions of formalin and 5-(5-nitro-2-furyl)-1,3,4-oxadiazol-2-one.

The following examples illustrate the invention in more detail but are not to be construed as limiting.

EXAMPLE 1

5-(5-Nitro-2-Furyl)-3-Hydroxymethyl-1,3,4-Oxadiazol-2-One

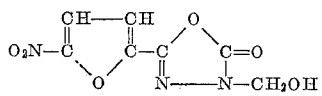

A mixture of 9.85 grams (0.05 mole) of 5-(5-nitro-2-furyl)-1,3,4-oxadiazol-2-one and 3.75 ml. (0.05 mole) of formalin in 40 ml. of water was heated to the boiling temperature and then warmed for one-half hour on a steam bath. Upon cooling the reaction mixture, an oil separated. The oil was crystallized from an ethanol-cyclohexane mixture to obtain the desired 5-(5-nitro-2-fury)-3-hydroxymethyl-1,3,4-oxadiazol-2-one as a white crystalline solid melting at 110°–111° C. This product contained 37.12% carbon, 2.62% hydrogen and 41.95% oxygen compared to the calculated values of 37.01%, 2.22% and 42.27%, respectively.

EXAMPLE 2

5-(5-Nitro-2-Furyl)-3-Diethylaminomethyl-1,3,4-Oxadiazol-2-One

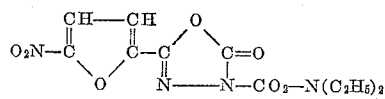

19.71 grams (0.1 mole) of 5-(5-nitro-2-furyl)-1,3,4-oxadiazol-2-one was dissolved in 200 ml. of absolute alcohol by gentle heating. To the resulting solution was added 7.5 ml. (0.1 mole) of formalin and 7.31 grams (0.1 mole) of diethylamine. Upon cooling the reaction mixture in an ice bath, there was obtained 6.08 grams of the desired 5-(5-nitro-2-furyl)-3-diethylaminomethyl-1,3,4-oxadiazol-2-one as a crystalline solid melting at 99° C. This product upon analysis was found to contain 46.59% carbon, 5.03% hydrogen and 28.62% oxygen compared to the calculated values of 46.81%, 5.00% and 28.35%, respectively.

EXAMPLE 3

5-(5-Nitro-2-Furyl)-3-Piperidinomethyl-1,3,4-Oxadiazol-2-One

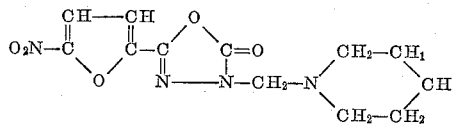

This product was prepared in the same manner as that described in Example 2 except that 8.52 grams (0.1 mole) of piperidine was employed in place of the diethylamine. The crystalline solid product was yellow-orange in color and after recrystallization from ethanol melted at 134° C. Identity was further established by elemental analysis.

EXAMPLE 4

5-(5-Nitro-2-Furyl)-3-Pyrrolidinomethyl-1,3,4-Oxadiazol-2-One

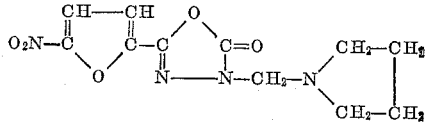

One tenth mole (19.71 grams) of 5-(5-nitro-2-furyl)-1,3,4-oxadiazol-2-one was dissolved in 200 ml. of boiling absolute ethanol containing 10 ml. of dimethylformamide. The resulting solution was then cooled to 40° C. and 7.5 ml. (0.1 mole) of formalin and 7.11 grams (0.1 mole) of pyrrolidine quickly added thereto. Upon further cooling, the desired product was obtained as a yellow, crystalline solid which after recrystallization from a dimethylformamide-ethanol mixture melted at 139° C. Elemental analysis further confirmed the identity of the product.

EXAMPLE 5

5-(5-Nitro-2-Furyl)-3-Morpholinomethyl-1,3,4-Oxadiazol-2-One

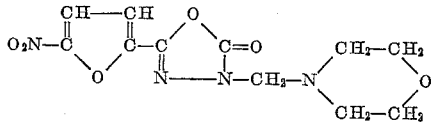

The procedure described in Example 4 was employed except that morpholine was employed instead of pyrrolidine. The product was isolated as a yellow, crystalline solid which after recrystalliation from dimethylformamide-alcohol melted at 190°–191° C. and contained 18.85% nitrogen compared to the theoretical value of 18.91% nitrogren.

EXAMPLE 6

*1,4-Bis-[5-(5-Nitro-2-Furyl)-2-Keto-1,3,4-Oxadiazolyl-1,3,4-Oxadiazol-2-One*

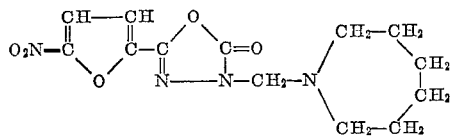

By employing the procedure described in Example 4 but substituting 9.92 grams (0.1 mole) of hexamethyleneimine for the pyrrolidine, the above product was obtained as a golden yellow, crystalline solid which melted at 135° C. Calculated for $C_{13}H_{16}N_4O_5$: C=50.64%; H=5.23%; N=18.18%. Found: C=50.79%; H=5.45%; N=18.32%.

EXAMPLE 7

*1,4-Bis-[5-(5-Nitro-2-Furyl)-2-Keto-1,3,4-Oxadiazolyl-3-Methyl]-Piperazine*

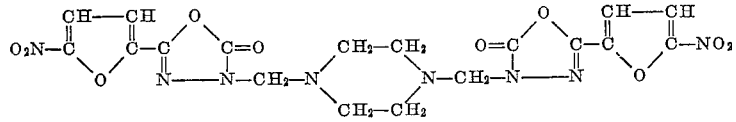

By substituting 4.31 grams (0.05 mole) of piperazine for the pyrrolidine of Example 4 and following the same procedure described therein, the above product was obtained as an orange solid melting at 200° C. with decomposition. Calculated for $C_{18}H_{16}N_8O_{10}$: C=42.86%; H=3.20%. Found: C=42.82%; H=3.35%.

In the same manner as that described in Example 2, other compounds contemplated to be within the scope of the present invention can be prepared as follows:

5 - (5-nitro-2-furyl)-3-dimethylaminomethyl-1,3,4-oxadiazol-2-one by the reaction of 5-(5-nitro-2-furyl)-1,3,4-oxadiazol-2-one with formalin and dimethylamine.

5 - (5-nitro-2-furyl)-3-dipropylaminomethyl-1,3,4-oxadiazol-2-one by the reaction of 5-(5-nitro-2-furyl)-1,3,4-oxadiazol-2-one with formalin and dipropylamine.

5 - (5 - nitro-2-furyl)-3-dibutylaminomethyl-1,3,4-oxadiazol-2-one by the reaction of formalin and dibutylamine with 5-(5-nitro-2-furyl)-1,3,4-oxadiazol-2-one.

The 5-(5-nitro-2-furyl)-1,3,4-oxadiazol-2-one employed as a starting material in this invention can be prepared as described in U.S. Serial No. 770,598, filed October 30, 1958, now U.S. Patent 2,918,473.

In addition to their use as antibacterial agents, the compounds of the present invention are also useful as coccidiostats and for the control of *Hexamita salmonis* and Trypanosoma infections.

What I claim as my invention is:

1. Compounds selected from the group consisting of 1,4-bis-5-(5-nitro-2-furyl)-2-keto - 1,3,4 - oxadiazolyl - 3-methyl-piperazine and a compound of the formula

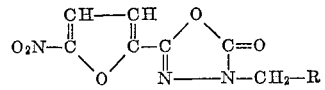

wherein R is a radical selected from the group consisting of dialkylamino containing from 2 to 8 carbon atoms inclusive, piperidino, pyrrolidino, morpholino and hexamethyleneimino.

2. 5-(5-nitro-2-furyl)-3-hydroxymethyl - 1,3,4 - oxadiazol-2-one.

3. 5-(5-nitro-2-furyl)-3-diethylaminomethyl-1,3,4 - oxadiazol-2-one.

4. 5-(5-nitro-2-furyl) - 3 - piperidinomethyl-1,3,4-oxadiazol-2-one.

5. (5-nitro-2-furyl) - 3 - pyrrolidinomethyl - 1,3,4 - oxadiazol-2-one.

6. 5 - (5 - nitro - 2 - furyl) - 3 - morpholinomethyl-1,3,4-oxadiazol-2-one.

7. 5-(5-nitro-2-furyl) - 3 - hexamethyleneiminomethyl-1,3,4-oxadiazol-2-one.

8. 1,4-bis-[5-(5-nitro-2-furyl)-2-keto-1,3,4-oxadiazolyl-3-methyl]-piperazine.

9. A method for the preparation of a compound of the formula

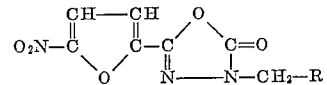

wherein R is a radical selected from the group consisting of diloweralkylamino, piperidino, pyrrolidino, morpholino and hexamethyleneimino which comprises dissolving one molecular proportion of 5-(5-nitro-2-furyl)-1,3,4-oxadiazol-2-one in boiling absolute ethanol, adding thereto an equimolecular proportion of formalin and an amine selected from the group consisting of diloweralkylamines containing from 2 to 8 carbon atoms inclusive, piperidine, pyrrolidine, morpholine and hexamethyleneimine, cooling the reaction mixture to precipitate the resulting product and purifying said product by crystalization from a suitable organic solvent.

10. A method for the preparation of 1,4-bis-[5-(5-nitro-2-furyl)-2-keto-1,3,4-oxadiazolyl-3 - methyl] - piperazine which comprises reacting one molecular proportion of piperazine with two molecular proportions of formalin and 5-(5-nitro-2-furyl)-1,3,4-oxadiazol-2-one in absolute ethanol at the boiling temperature of the reaction mixture and cooling said mixture to precipitate the resulting product.

References Cited in the file of this patent

Adams et al.: Organic Reactions, vol. 1; page 306 (1942 edition), John Wiley & Sons, Inc.

UNITED STATES PATENT OFFICE
CERTIFICATION OF CORRECTION

Patent No. 3,024,233            March 6, 1962

William R. Sherman

It is hereby certified that error appears in the above numbered patent requiring correction and that the said Letters Patent should read as corrected below.

Column 2, lines 10 to 13, the lower right-hand portion of the formula reading "—$CO_2$-$N(C_2H_5)_2$" read -- —$CH_2$-$N(C_2H_5)_2$ --; lines 30 to 34, the right-hand portion of the formula should appear as shown below instead of as in the patent:

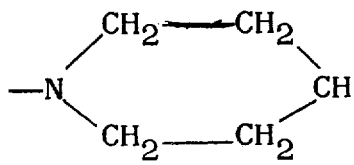

column 3, lines 7 and 8, title to EXAMPLE 6, for "1,4-Bis-[5-(5-Nitro-2-Furyl)-2-Keto-1,3,4-Oxadiazolyl-1,3,4-Oxadiazol-2-One" read -- 5-(5-Nitro-2-Furyl)-3-Hexamethyleniminomethyl-1,3,4-Oxadiazol-2-One --.

Signed and sealed this 26th day of June 1962.

(SEAL)
Attest:

ERNEST W. SWIDER            DAVID L. LADD
Attesting Officer            Commissioner of Patents